Figure 1:
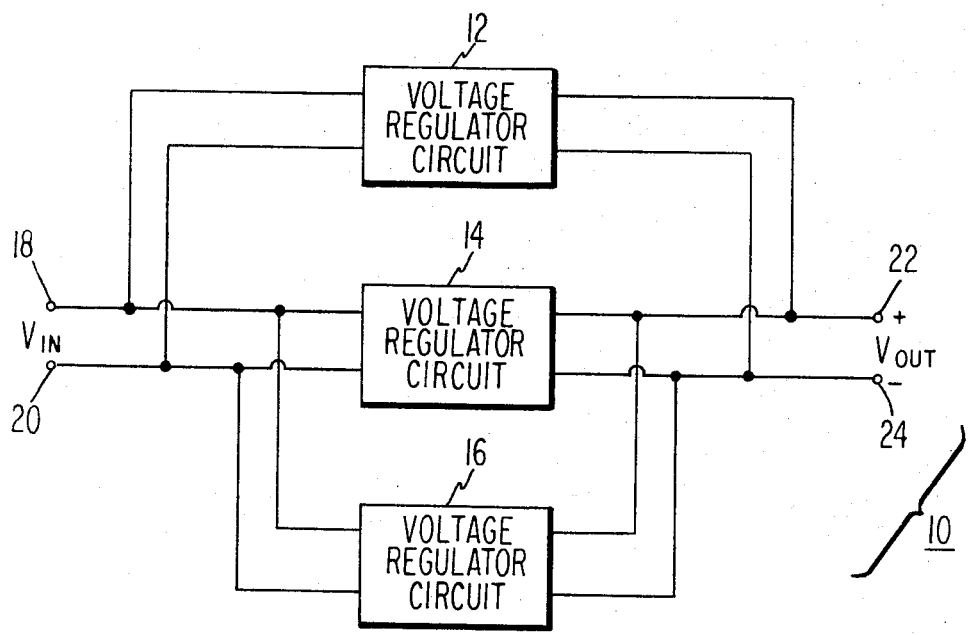

# United States Patent [19]
Johnson et al.

[11] 3,824,450
[45] July 16, 1974

[54] POWER SUPPLY KEEP ALIVE SYSTEM
[75] Inventors: Miles Carrington Johnson, Mount Holly; Donald Page Clock, Granada Hills, both of Calif.
[73] Assignee: RCA Corporation, New York, N.Y.
[22] Filed: May 14, 1973
[21] Appl. No.: 359,902

[52] U.S. Cl............ 323/23, 321/2, 323/17, 323/DIG. 1
[51] Int. Cl........ G05f 1/46, G05f 1/64, H02m 3/24
[58] Field of Search............. 307/64, 65; 321/2, 18; 323/4, 17, 22 T, 23, 25, DIG. 1

[56] References Cited
UNITED STATES PATENTS
3,414,803  12/1968  Glasgow et al. ................. 323/4
3,521,150  7/1970  Bates ............................. 323/25 X Primary Examiner—A. D. Pellinen
Attorney, Agent, or Firm—Edward J. Norton; Joseph S. Tripoli

[57]  ABSTRACT

A power supply system comprising a plurality of parallel connected voltage regulators, each regulator having a voltage control loop. Each voltage regulator is provided with a circuit which increases the reference voltage supplied to the voltage control loop so that the control loop of each regulator is prevented from being cut off during standby operation.

9 Claims, 2 Drawing Figures 3,824,450

POWER SUPPLY KEEP ALIVE SYSTEM

The invention herein described was made in the course of or under a contract or subcontract thereunder with the Department of the Navy.

The present invention relates to power supply systems in general and more particularly to parallel connected power supplies where circuitry is provided for maintaining each individual supply operative during standby operation.

There are many applications where it is desirable to connect a plurality of voltage regulated power supplies in parallel with each other between a pair of input terminals and a pair of output terminals. One of the reasons for connecting voltage regulators in parallel is to provide for fail safe operation of the supply system. That is, if one regulator should fail, another regulator in the power supply system can be activated to pick up the load.

One of the problems with the paralleled regulator approach is that all of the regulators connected in parallel will not always be set to regulate at the same output voltage. Thus, one or more of the regulators will regulate at a slightly higher voltage than the other regulators. When other regulators in the system detect a slightly higher output voltage than that which they are set to regulate at, their control loops will try to reduce the output voltage by reducing the conduction of current through their regulating elements. Since the output voltage, under these conditions, is not lowered by the regulators set at the lower regulated output voltage, these regulators continue to attempt to lower the system output voltage until the control loops of these particular regulators are fully cut off.

Thus in the system described above, several ones of the paralleled regulators are shut down while in the standby condition. When these regulators are called into service, it will take a certain amount of time before equilibrium is reached since they are starting from a cut off condition, but, even more serious is the generation of larger voltage transients due to the aforementioned condition as well as due to changes in the system loading conditions.

The present invention provides a paralleled system of voltage regulators where each regulator is maintained in an operative state during standby so that each regulator is always ready to pick up changing load conditions and thus output voltage transients are minimized.

Figure 2:
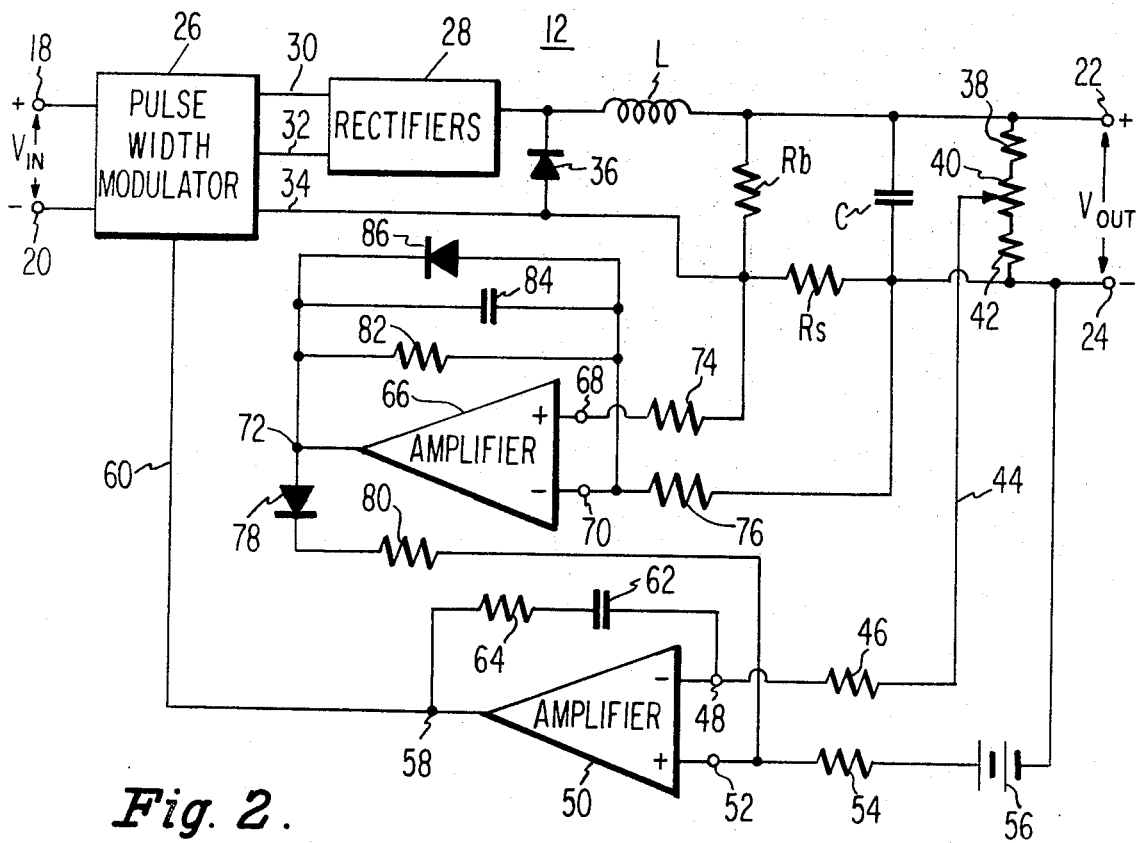

In accordance with the present invention there is provided a system for supplying a regulated voltage to a load from an unregulated source of voltage, the system comprises a plurality of regulated power supply circuits connected in parallel with each other. Each of the regulated supply circuits comprises: a regulating means for supplying a particular voltage to at least one output terminal; a means for sensing the current supplied to the load; and a control loop connected between the output terminals and the regulating means for controlling the conduction of current through the regulating means. In addition, each regulated supply circuit comprises a means connected between the current sensor and the control loop for maintaining the control loop active when the voltage at the system output terminals rises slightly above a particular voltage level. In the Drawing:

FIG. 1 is a block diagram of a parallel connected power supply system in accordance with the present invention; and FIG. 2 is a partial block and partial schematic diagram of an embodiment of one of the voltage regulating supply circuits used in the system of FIG. 1.

Referring now to FIG. 1, a power supply system 10 is provided comprising a plurality of individual voltage regulated power supply circuits 12, 14, and 16. Each of the regulated power supply input terminals are connected in parallel to a pair of system input terminals 18 and 20. A source of unregulated voltage (not shown) is connected to system input terminals 18 and 20. In addition, each of the output terminals of the individual regulated supply circuits are connected in parallel with each other at a pair of system output terminals 22 and 24. The voltage supplied to the output terminals 22 and 24, $V_{out}$, is a regulated dc output voltage.

Although three individual voltage regulated power supplies 12, 14 and 16 are shown in FIG. 1, there may, of course, be many additional individual circuits connected in parallel with those shown between input terminals 18 and 20 and output terminals 22 and 24. Output terminals 22 and 24 are adapted for connection to a load which requires a regulated dc voltage.

Referring now to FIG. 2, one individual voltage regulated power supply circuit 12 is shown more fully. All of the individual supply circuits 12, 14 and 16 will have the same general configuration. The unregulated dc input voltage, $V_{in}$, is applied to input terminals 18 and 20. The unregulated voltage, $V_{in}$, may be supplied from an unregulated source of dc voltage (not shown) including a source of ac signal waves which have been filtered and full wave rectified. Input terminals 18 and 20 are connected to a regulator circuit 26. It will be understood in the practice of the present invention that regulator circuits 12, 14 and 16 may each be preceded by separate unregulated voltage sources, $V_{in}$, which then moves the paralleling terminals 18 and 20 to the input terminals of the separate unregulated sources. The regulating circuit 26 may take on many forms, and in the circuit of FIG. 2 the regulator is configured in the form of a pulse width modulator.

The output signals from the pulse width modulator 26 are coupled to a rectifying circuit 28 via lines 30 and 32. The dc level at the output of the rectifier circuit 28 is coupled to one end of a series inductor L. The other end of the series inductor L is connected to output terminal 22. Series inductor L provides an energy storage function which is known in the switching art.

In addition, another output line 34 is provided from pulse width modulator 26. A diode 36 is also provided having the anode electrode thereof connected to line 34 and the cathode electrode thereof connected to a point between the output line of the rectifier circuit 28 and one end of inductor L. Diode 36 performs a flyback function as is well known in the switching regulator art. It will be understood that in the practice of the present invention the function of diode 36 may be accomplished by full wave rectifier 28.

A bleeder resistor $R_b$ is connected between the other end of inductor L and line 34. A resistor $R_s$ is also provided between the end of resistor $R_b$ which is connected to line 34 and output terminal 24. It will be noted that resistor $R_s$ is connected in series with the output terminals 22 and 24 with the load (not shown) connected. Thus, resistor $R_s$ provides a current sensing function for the regulator circuit 12. A filter capacitor C is also provided directly across the output terminals 22 and 24.

The regulator circuit 12 also comprises a voltage control loop effectively connected between the output terminals 22 and 24 and the regulating means, namely, the pulse width modulator 26. The control loop includes and output voltage sensing network comprising resistors 38, 40 and 42 serially connected across output terminals 22 and 24. Resistor 40 is a potentiometer having a wiper arm connected via line 44 and a resistor 46 to one input 48 of a voltage comparator amplifier 50. The other input terminal 52 of amplifier 50 is connected to output terminal 24 via a resistor 54 and a reference voltage source 56. Source 56 provides a voltage, $V_{ref}$, to one side of amplifier 50 to be compared with a voltage level related to the output voltage, $V_{out}$, supplied to the other input terminal 48 of amplifier 50. The output terminal 58 of amplifier 50 is connected to the pulse width modulator 26 via line 60. In addition, the serial combination of capacitor 62 and resistor 64 is connected across input terminal 48 and output terminal 58 of amplifier 50.

Thus far a typical switching type voltage regulator has been described, wherein a regulated voltage, $V_{out}$, is supplied to the output terminals 22 and 24. When the output voltage, $V_{out}$, rises above the prescribed voltage level, the rise in voltage is sensed on line 44 and unbalances amplifier 50 whereupon the appropriate control signal is provided at the amplifier output terminal 58 such that the regulating means 26 conducts less current and the output voltage is made to return to the other desired regulated level. In the same way decreases in output voltage level will be compensated for through the response of the control loop.

The voltage regulator 12 further comprises a current amplifying loop including another amplifier 66 having input terminals 68 and 70 and an output terminal 72. Input terminal 68 is connected to the junction between resistors $R_b$ and $R_s$ via a resistor 74. Input terminal 70 of amplifier 66 is connected to the junction of capacitor C and the other end of resistor $R_s$ via resistor 76. Output terminal 72 of amplifier 66 is connected to the anode of diode 78. The cathode of diode 78 is connected to one end of resistor 80. The other end of resistor 80 is connected to input terminal 52 of the voltage comparator 50. That is, the output signals from amplifier 66 are coupled to the reference voltage side of voltage comparator 50. In addition, a resistor 82 is connected in parallel with a capacitor 84 across input terminal 70 and output terminal 72 of amplifier 66. The anode of a diode 86 is also connected to input terminal 70 of amplifier 66 while the cathode electrode of diode 86 is connected to output terminal 72 of amplifier 66.

The circuitry connected across resistor $R_s$ and coupled to the reference side of amplifier 50 may be termed the keep alive circuitry and will be found in each of the supplies which are connected in parallel between the input terminals 18 and 20 and the output terminals 22 and 24.

The operation of the circuitry just described is as follows. When the voltage across the output terminals 22 and 24, as seen by the regulator 12, rises due to the connection of some other supply to the output terminals 22 and 24 having slightly higher regulated output voltage than that of regulator 12, the current supplied from the pulse width modulator 26 will start to go down. When the current from the pulse width modulator 26 becomes less than the current through the bleeder resistor $R_b$, then some of the bleeder current is being supplied from the paralleled supply system through the output terminals 22 and 24. When this occurs, the voltage across the current sensing resistor, $R_s$, reverses. This voltage reversal causes amplifier 66 to become active and produces an output voltage at terminal 72 which is proportional to the voltage appearing across resistor $R_s$ at this time. A portion of the voltage appearing at terminal 72 is added to the reference voltage appearing at terminal 52 of amplifier 50 via diode 78 and resistors 80 and 54. The net result is that the amplifier 50 in the voltage control loop experiences an increasing effective reference voltage until equilibrium is reached at approximately the reference voltage needed to produce the higher system output voltage forced by the paralleled arrangement. At this stable operating point some of the bleeder current through resistor $R_b$ is being supplied by the other individual paralleled regulator circuits and some of the bleeder current is being supplied by the pulse width modulator 26. Thus, the voltage control loop remains active as opposed to having been cut off when the system output voltage rose slightly due to the paralleled arrangement.

Resistor 82 and capacitor 84 form a low frequency lag network. For stability purposes this lag network's break frequency is designed to be approximately two orders of magnitude below the upper frequency limit of the voltage control loop. The selection of a relatively slow response for the keep alive circuitry provides an added advantage in that all of the paralleled supply circuits will share the load during load transients. This is a result of the fact that the keep alive circuitry maintains each of the supplies paralleled at the same terminal voltage with their individual control loops in an active state. Any relatively fast load transient which causes the system voltage to drop will be corrected for by all of the individual voltage control loops acting in unison since the slow response of the keep alive circuitry will maintain the effective reference voltage at terminal 52 of amplifier 50 almost constant during the transient. In the absence of the keep alive circuitry the voltage control loops would respond sequentially as the system voltage appearing across terminals 22 and 24 drops rather than simultaneously. Furthermore, because the voltage control loops are operating beyond the cut off point due to the high terminal voltage, when the terminal voltage drops during a load transient, time is required for the control loops to return to the normal operating condition due to the response limitation imposed on the circuit by the compensation network R64 and C62. Therefore, the system would not correct as quickly without the keep alive circuitry.

Diode 86 tends to keep amplifier 66 operating linearly under normal conditions by reducing the gain of amplifier 66 to less than unity to prevent amplifier 66 from being driven into saturation. When the regulated supply circuit 12 is operating normally and supplying current to the system output terminals 22 and 24, diode 78, in effect, disconnects the keep alive circuitry from the reference voltage source 56 since the voltage control loop will be operating normally at this time.

An additional important benefit achieved in the paralleled supply system with keep alive circuitry is that by keeping all of the paralleled regulators in an operative state, at least at a low current level, it can be presumed that various regulators are, in fact, capable of supplying current on demand. Thus, if the control loop in a particular regulator has actually turned completely off, it means that the particular supply has failed and is presumed incapable of picking up a load on demand. Without the presence of the keep alive circuitry, the normal standby mode of operation would result in a cut off condition of the regulator thereby making it virtually impossible to determine whether the loop has failed or is merely in a standby condition.

The keep alive circuitry previously described provides a mode of operation whereby it is possible to achieve simple and effective monitoring of the operational readiness of each of the individual paralleled regulator circuits. The monitoring is achieved simply by sensing the presence or absence of voltage or current out of the pulse width modulator 26. There will, of course, be provided additional circuitry which is not shown herein for detecting overvoltage and/or overcurrent conditions with the appropriate response in the event that one of these conditions is detected.

What is claimed is:

1. In a system for supplying a regulated voltage to a load from an unregulated source of voltage, said system comprising a plurality of regulated power supply circuits connected in parallel with each other between a pair of input terminals and a pair of output terminals, said input terminals being adapted for connection to said source of unregulated voltage, said output terminals being adapted for connection to said load, each of said power supply circuits comprising:
   a regulator means connected between at least one input terminal and at least one output terminal for supplying a particular voltage level to said at least one output terminal;
   means connected in circuit with said output terminals and said regulator means for sensing the current supplied to said load;
   a control loop connected in circuit with said output terminals and said regulator means for controlling the conduction of current through said regulator means; and
   means connected between said current sensing means and said control loop for keeping said control loop active when the voltage appearing across said output terminals rises slightly above said particular voltage level and for causing said control loop to operate such that a regulated voltage is provided at said output terminals at a level substantially equal to the highest particular voltage level supplied by any one of said plurality of regulated power supply circuits.

2. The system according to claim 1 wherein each power supply circuit control loop includes a voltage comparator circuit for comparing a reference voltage to a voltage representing the voltage appearing across said output terminals and wherein said means for keeping said control loop active comprises a means for raising the reference voltage level supplied to said voltage comparator.

3. The system according to claim 2 wherein said means for keeping said control loop active comprises an amplifier having a pair of input terminals connected across said current sensing means and an output terminal connected to said voltage comparator circuit to raise the reference voltage level supplied to said voltage comparator.

4. The system according to claim 3 wherein said amplifier includes a lag network connected between one of said amplifier input terminals and said amplifier output terminal.

5. In a system for supplying a regulated voltage to a load from an unregulated source of voltage, said system comprising a plurality of power supply circuits connected in parallel with each other between a pair of input terminals and a pair of output terminals, said input terminals being adapted for connection to said source of unregulated voltage, said output terminals being adapted for connection to said load, each of said power supply circuits comprising:
   a regulator means connected between at least one input terminal and at least one output terminal;
   means for sensing the voltage across said output terminals and for providing a first signal representative of said sensed voltage;
   means for providing a reference voltage;
   means responsive to said first signal and to said reference voltage for providing a control signal to said regulator means;
   a current sensing means connected in series with said output terminals for providing a second signal representative of the current supplied to said output terminals; and
   signal translating means responsive to said second signal for providing a third signal;
   means for adding said third signal to said reference voltage;
   each of said third signals provided in each of said power supply circuits causing the corresponding ones of said plurality of power supply circuits to provide a regulated voltage to said output terminals at a level substantially equal to the highest regulated voltage supplied by any one of said plurality of power supply circuits.

6. The system according to claim 5 wherein said signal translating means comprises a first amplifier circuit having a pair of input terminals connected across said current sensing means and an output terminal connected to said means for adding said third signal to said reference voltage.

7. The system according to claim 6 further including a unidirectional semiconductor device connected between said amplifier circuit output terminal and said means for adding said third signal and said reference voltage.

8. The circuit according to claim 5 wherein said means for providing a control signal comprises a second amplifier having a first and second input terminal and an output terminal, said first input terminal thereof being connected to said voltage sensing means, said second input terminal thereof being connected to said means for providing said reference voltage, and said output terminal thereof being connected to said regulator means.

9. The system according to claim 8 further comprising a frequency lag network connected between one input terminal and the output terminal of said first amplifier, said lag network causing the response time of said first amplifier to be slower than the response time of the second amplifier.

* * * * *